US008442905B2

(12) United States Patent
Morik

(10) Patent No.: US 8,442,905 B2
(45) Date of Patent: May 14, 2013

(54) SYSTEM AND METHOD FACILITATING WHOLE LOAN TRI-PARTY REPURCHASE AGREEMENT TRANSACTIONS

(75) Inventor: John Morik, Old Bridge, NJ (US)

(73) Assignee: The Bank of New York, New York, NY (US)

( * ) Notice: Subject to any disclaimer, the term of this patent is extended or adjusted under 35 U.S.C. 154(b) by 962 days.

(21) Appl. No.: 11/561,747

(22) Filed: Nov. 20, 2006

(65) Prior Publication Data
US 2008/0120213 A1 May 22, 2008

(51) Int. Cl.
G06Q 40/00 (2012.01)
(52) U.S. Cl.
USPC ............................................. 705/38; 705/35
(58) Field of Classification Search .......... 705/38, 705/35
See application file for complete search history.

(56) References Cited

U.S. PATENT DOCUMENTS

| 5,802,499 | A | | 9/1998 | Sampson | |
|---|---|---|---|---|---|
| 6,016,482 | A | * | 1/2000 | Molinari et al. | 705/35 |
| 6,125,355 | A | * | 9/2000 | Bekaert et al. | 705/36 R |
| 6,304,858 | B1 | * | 10/2001 | Mosler et al. | 705/37 |
| 2002/0147670 | A1 | * | 10/2002 | Lange | 705/35 |
| 2004/0030638 | A1 | * | 2/2004 | Dwin | 705/38 |
| 2004/0093301 | A1 | * | 5/2004 | Fitzpatrick et al. | 705/37 |
| 2005/0060255 | A1 | * | 3/2005 | Heaton | 705/37 |
| 2005/0278249 | A1 | | 12/2005 | Jones et al. | |
| 2006/0224480 | A1 | | 10/2006 | Bent et al. | |
| 2006/0253361 | A1 | * | 11/2006 | Robinson et al. | 705/35 |
| 2007/0192225 | A1 | * | 8/2007 | Schroeder et al. | 705/36 R |

FOREIGN PATENT DOCUMENTS

| WO | 2007/095519 A3 | 8/2007 |
|---|---|---|
| WO | 2008/063922 A2 | 5/2008 |

OTHER PUBLICATIONS

Jones, P. (1997). The fight for tri-party repo. ICB, 13(4), 28-28. Retrieved on Jan. 11, 2013.*
International Search Report and Written Opinion issued on Nov. 7, 2008 in related International Application No. PCT/US07/84262.
International Search Report issued in PCT/US2007/62030, Sep. 12, 2007, 2 pages.
Written Opinion of the Searching Authority issued in PCT/US2007/62030, Sep. 12, 2007, 5 pages.
International Preliminary Report on Patentability as issued for International Application No. PCT/US2007/084262, dated Jul. 27, 2011.

* cited by examiner

Primary Examiner — Kito R Robinson
(74) Attorney, Agent, or Firm — Pillsbury Winthrop Shaw Pittman, LLP

(57) ABSTRACT

A system and method facilitates tri-party repurchase transactions for whole loans. The system and method obtain details regarding a whole loan to be used for collateral in a tri-party agreement transaction with an investor, from both the dealer or trader offering the whole loan as collateral and one or more third parties with access to those details. Based on the received details, the system formulates a valuation of the whole loan collateral and posts a whole loan collateral entry to facilitate tri-party repurchase of the whole loan collateral.

22 Claims, 4 Drawing Sheets

SYSTEM AND METHOD FACILITATING WHOLE LOAN TRI-PARTY REPURCHASE AGREEMENT TRANSACTIONS

BACKGROUND OF THE INVENTION

1. Field of the Invention

The present invention relates to administering and facilitating financial transactions. More specifically, the present invention relates to automated handling of financial transactions known as Tri-Party Repurchase Agreements, which are also commonly known as tri-party "repo" agreements.

2. Description of Related Art

A repurchase agreement or "repo" agreement (or, simply, "repo") is a contract giving the seller of an asset the right or obligation to buy back the asset at a specified price on a given date. Generally speaking, a repo agreement is a form of short term borrowing for dealers in various types of assets, e.g., government securities, loan obligations, etc. The dealer sells the assets to investors, usually on an overnight basis, and buys them back the following day. For the party (e.g., a dealer) selling the assets (and agreeing to repurchase it in the future) it is a "repo"; for the party (e.g., an investor) on the other end of the transaction (buying the asset and agreeing to sell in the future), it is a "reverse repurchase agreement." However, the transaction is often just simply termed a "repo" by both parties. A repo is similar to a secured loan, with the lender of money receiving assets as collateral to protect against default. The legal title to the assets passes from the dealer or seller, i.e., the provider of the collateral, to the investor, i.e., the party providing the money.

For the buyer or investor, a repo is an opportunity to invest cash for a custom period of time, typically overnight, as mentioned (whereas other investments typically involve whole numbers of months). Moreover, a repo is a short-term and secure investment; in return for investing, the investor receives a rate of interest as well as collateral to secure the investment.

For the dealer or seller, repos are used to cost effectively finance long positions.

In practice, a repo agreement can be transacted in several ways. In a first way, the investor and the dealer negotiate with one another and close an agreed-to deal without any outside assistance. The dealer then would deliver securities to the investor and the investor would deliver cash to the dealer. This is typically referred to as a "DVP repo," or "delivery versus payment repo."

A second, more common way to effect a repo transaction is to involve a trusted third party, or intermediary, to match the details of the trade agreed between the seller and the buyer, and to assume all of the post trade processing and settlement work related to the trade; this is typically referred to as a "tri-party repo." The third party is typically a bank. As illustrated in FIG. 1, in a tri-party repo, the third party acts as a "tri-party repo service provider" 110 to the two principal parties in the underlying trade, i.e., the broker/dealer/seller 120 and the buyer/investor 130. Typical types of underlying trades include not only repurchase agreements, but also securities lending agreements, loan agreements, derivatives agreements and others.

FIG. 2, shows a generic transaction flow for a tri-party repurchase agreement where a service provider (typically a custodian bank) is disposed (logically speaking) in the middle of the transaction to ensure that each party to the transaction is never without either cash or assets throughout the term of the transaction, thereby ensuring that both parties are "whole" at all times. The presence of the third party service provider not only brings an additional layer of security to the transaction, but it also brings efficiencies and reduced costs for both principal parties to the trade.

In the tri-party repurchase agreement transaction flow shown in FIG. 2 and beginning at 200, a dealer/seller/borrower/trader and an investor/buyer/lender first agree, between themselves, on a particular trade at 210. Thereafter, the third party service provider receives trade instructions from both the dealer and the investor at 220. An account administrator at the tri-party repo service provider then matches the instructions from the investor to the instructions received from the dealer at 230 or the investor can directly "match"—or confirm—the details of the trade directly on a repo system. Once a match has been confirmed by the account administrator, the investor delivers the agreed-upon cash or loan amount (such as loan amount 150, illustrated in FIG. 1) to the tri-party repo service provider at 240. At essentially the same time, the tri-party repo service provider already maintains assets on behalf of the dealer and may receive additional assets from the dealer via other methods including files, pledges or repos. The tri-party repo service provider thereafter confirms to the investor that all, some or none of the assets are eligible per the tri-party agreement, and applies applicable margin to the assets per the tri-party agreement at 250. The assets are segregated in an escrow account established in the name of the investor at 260. The tri-party repo service provider also transfers the cash/loan amount to the dealer at 270 and the transaction flow process ends at 280.

As mentioned above, conventional tri-party repo markets may facilitate trades involving whole loans as well. Instead of securities, the collateral is in the form of unsecuritised, mortgage backed, residential and commercial loans but may include other asset types such as credit card receivables, auto loans and other consumer loans.

In mortgage whole loan repos, the lender obtains a claim (equal to the amount of the loan) against an underlying property. Consumer whole loan repo collateral is typically in the form of credit card or automobile receivables.

Conventionally, daily files at the trust receipt level or loan level indicating balances are sent from the dealer to the tri-party repo service provider. The file information includes a description, price and balance of the whole loan; loan descriptions include conforming, non-conforming, multi-family, commercial, non-performing but may include other asset types. Trust receipts and assignment letters are delivered to tri-party repo service provider for safekeeping.

SUMMARY OF THE INVENTION

However, conventional whole loan tri-party markets use the "unverified" assets (whole loans) as the collateral to secure the funding needs of the broker/dealers. The term "unverified" refers to the fact that the market prices, loan balances and the loan characteristics are not provided by a third party (different than the tri-party service provider) and are actually provided to the tri-party service provider, and, therefore, the investor, by the dealer who is borrowing the cash against the unverified asset. As a result, lending on these assets is often viewed as a form of unsecured lending.

In accordance with at least one embodiment of the invention, a system and method are provided that provide a collateral management service for whole loan tri-party transactions. This collateral management service utilizes information and instruction interfaces with various third parties (e.g., document custodians, loan service providers, pricing vendors, etc.) to enable receipt of confirmation and verification of up-to-date balances, loan characteristics and prices by the tri-party service provider. As a result, in accordance with at least one embodiment of the invention, a methodology and functionality is provided to enable independent third party verification of loan balance and loan characteristics.

In accordance with at least one embodiment of the invention, a more marketable asset is produced by providing the investor with more comfort that the value of the asset pledged to them is legitimate.

In accordance with at least one embodiment of the invention, a methodology and functionality is provided to enable third party pricing of inventory.

In accordance with at least one embodiment of the invention, the tri-party repo service provider acts as the document custodian on the whole loan(s) that are the assets upon which the repo acts.

DETAILED DESCRIPTION OF INVENTION

For a fuller understanding of the context of the present invention and details readily understood to be inherent in the present application's disclosure, the entire contents of U.S. patent application Ser. No. 09/948,205, entitled "Electronic Collateral Management System and Method", filed on Sep. 6, 2001, are hereby incorporated by reference.

As will be appreciated by those skilled in the art, the present invention provides several enhancements to whole loan tri-party repo transaction processing. Embodiments of the present invention allow investors to provide more secured transactions because the collateral management service utilizes information and instruction interfaces with various third parties (e.g., document custodians, loan service providers, pricing vendors, etc.) to enable receipt of confirmation and verification of up-to-date balances, loan characteristics and prices by the tri-party service provider.

The PSA Agreement, the US standard for repo, is used for whole loan repo transactions. This contains a full set of contractual rights and obligations, including rights of repricing and clearly defined events of default.

Collateral is marked to market daily to ensure that this margin is maintained, but because of the complex nature of whole loan valuation, the calculations of the market values may be performed by a trusted third party pricing vendor 355 (although the calculations may be performed in house).

In accordance with at least one embodiment of the invention, the tri-party repo service provider may provide a central data repository. In accordance with at least one embodiment of the invention, the tri-party repo service provider may receive files from document custodians, loan service providers, dealers, pricing vendors, etc. to provide daily, up to date reconciled balances at the loan level, daily prices and other data elements unique to each loan to a system supporting processing of tri-party repo processing utilized by the tri-party repo service provider.

Figure 1:
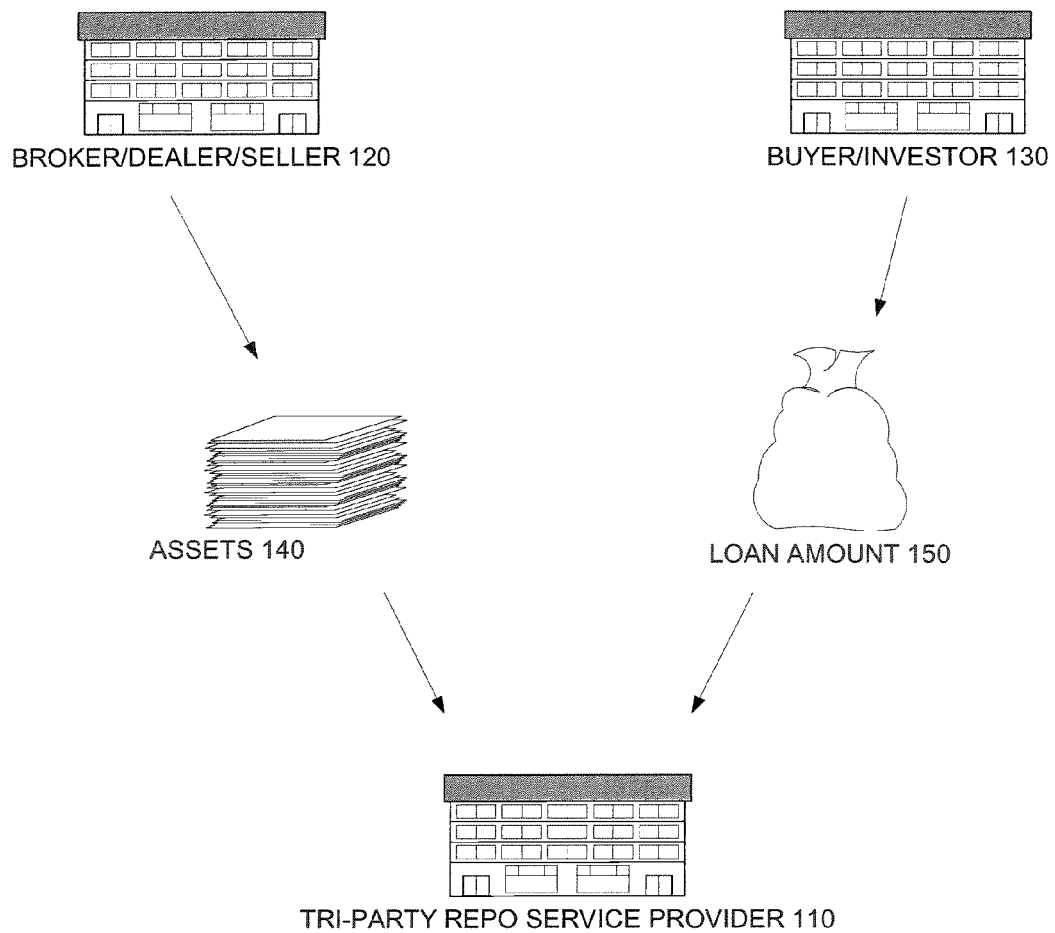
FIG. 1 illustrates a typical structure of a conventional tri-party repo transaction.
Figure 2:
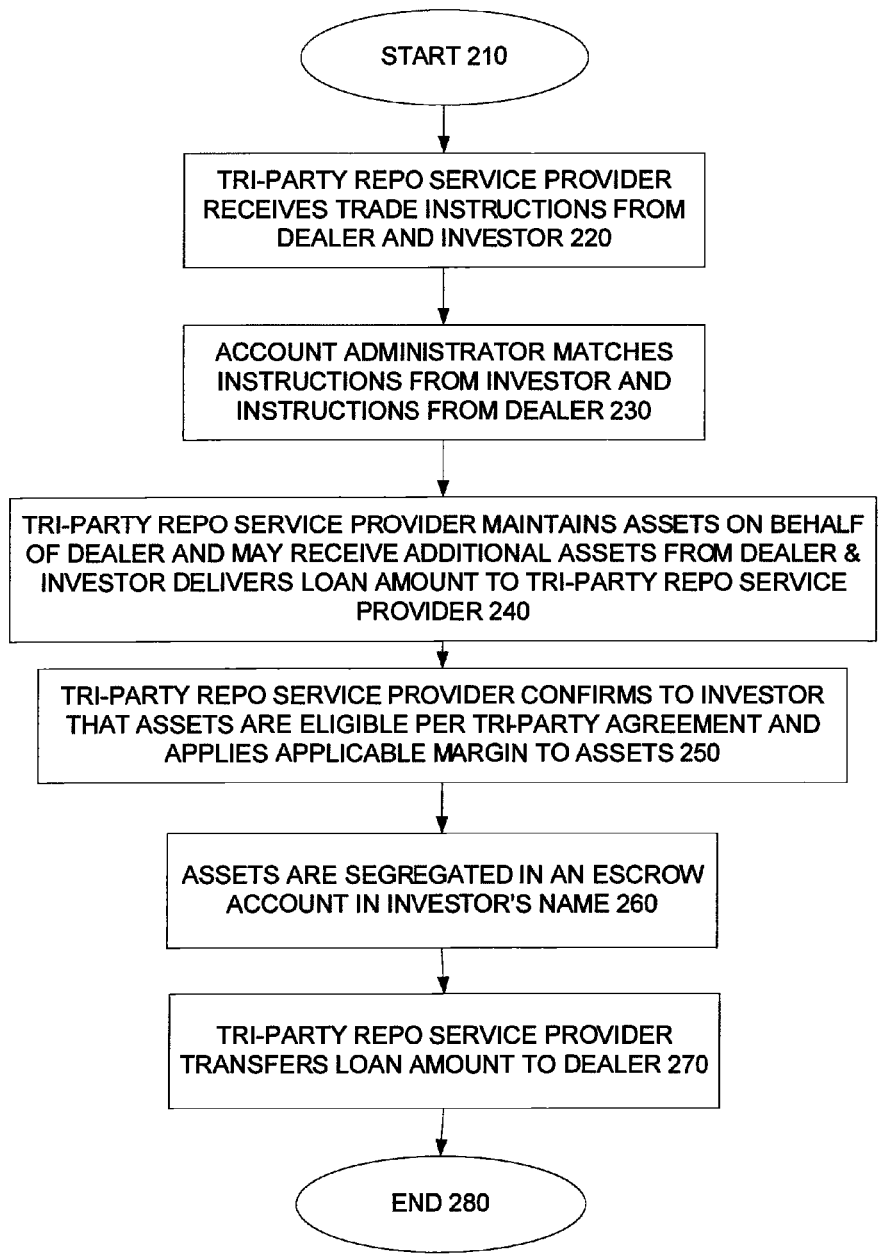
FIG. 2 illustrates a conventional tri-party repo transaction processing flow.
Figure 3:
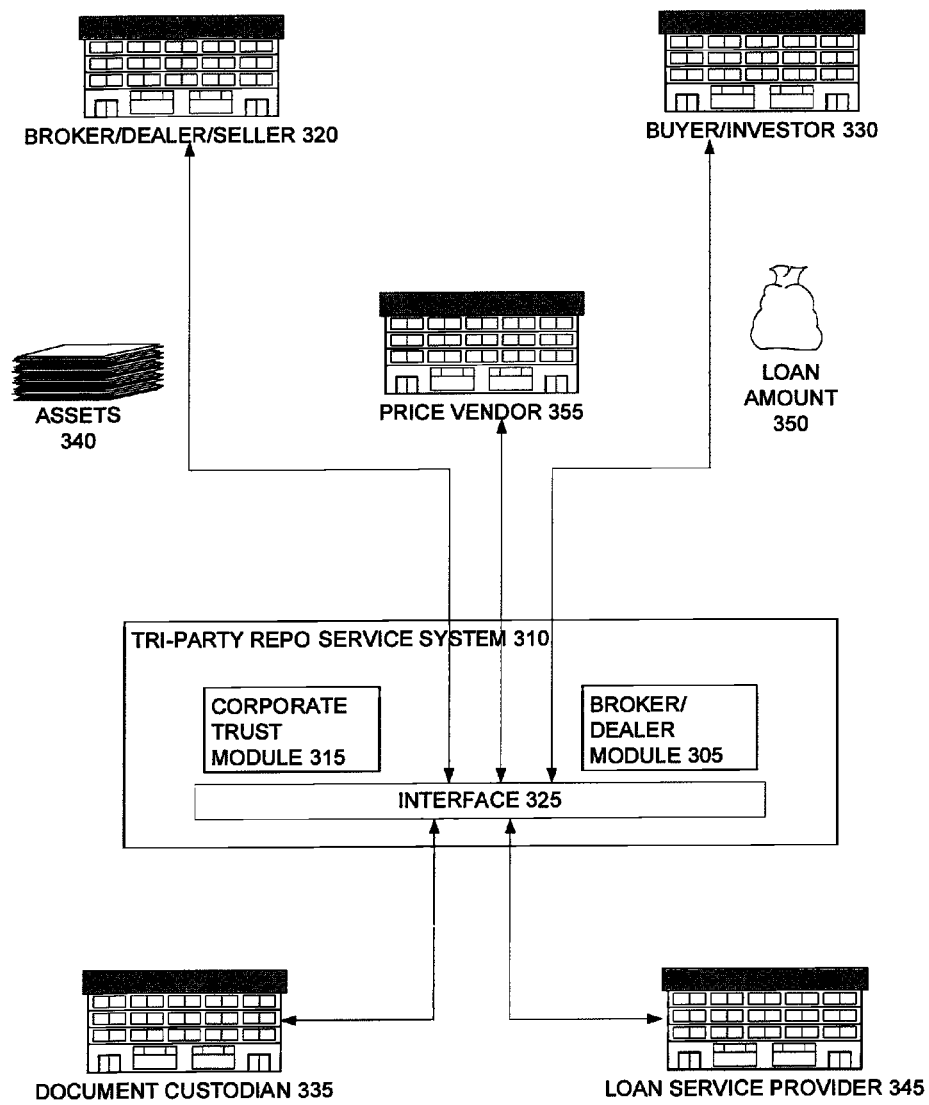
FIG. 3 illustrates structure of a tri-party repo transaction in accordance with at least one embodiment of the invention.

FIG. 3 illustrates structure of a tri-party repo transaction in accordance with at least one embodiment of the invention. As illustrated in FIG. 3, the tri-party service processing system 310 interacts with the broker/dealer/seller 320 and the buyer/investor 330 to receive the assets 340 (e.g., repurchase agreements, but also securities lending agreements, loan agreements, derivatives agreements, etc.) and the loan amount 350, respectively.

The tri-party repo service processing system 310 utilizes both a data warehouse module 315 and a collateral management module 305 to process various pieces of information received from interested parties via an interface 325 configured to receive and transmit information from and to various interested parties including broker/dealer/sellers 320, buyer/investors 330, document custodians 335, loan service providers 345 and price vendors 355. Though not illustrated in FIG. 3, it should be understood that the tri-party repo processing system 310 and its constituent modules include one or more databases and processors utilized to perform various operations in connection with the practicing of the invention.

In accordance with at least one embodiment of the invention, the tri-party repo service processing system 310 may support or utilize independent pricing provided by a third party. For example, a methodology and functionality may be provided to enable independent third party pricing from a price vendor 355. Such independent third party pricing may provide an increased level of confidence in the asset valuation subsequently performed by the tri-party repo service processing system.

As illustrated in FIG. 3, the tri-part repo processing system 310, more particularly, the corporate trust module 315, may be configured to receive data from third party pricing vendor 355 in a database of some type. Based on that data, one or more processors may perform various operations to process third-party repos for broker/dealer/sellers and provide information to the broker/dealer module 305 for subsequent use in providing services to the broker/dealer/sellers 320 and buyer/investors 330.

Figure 4:
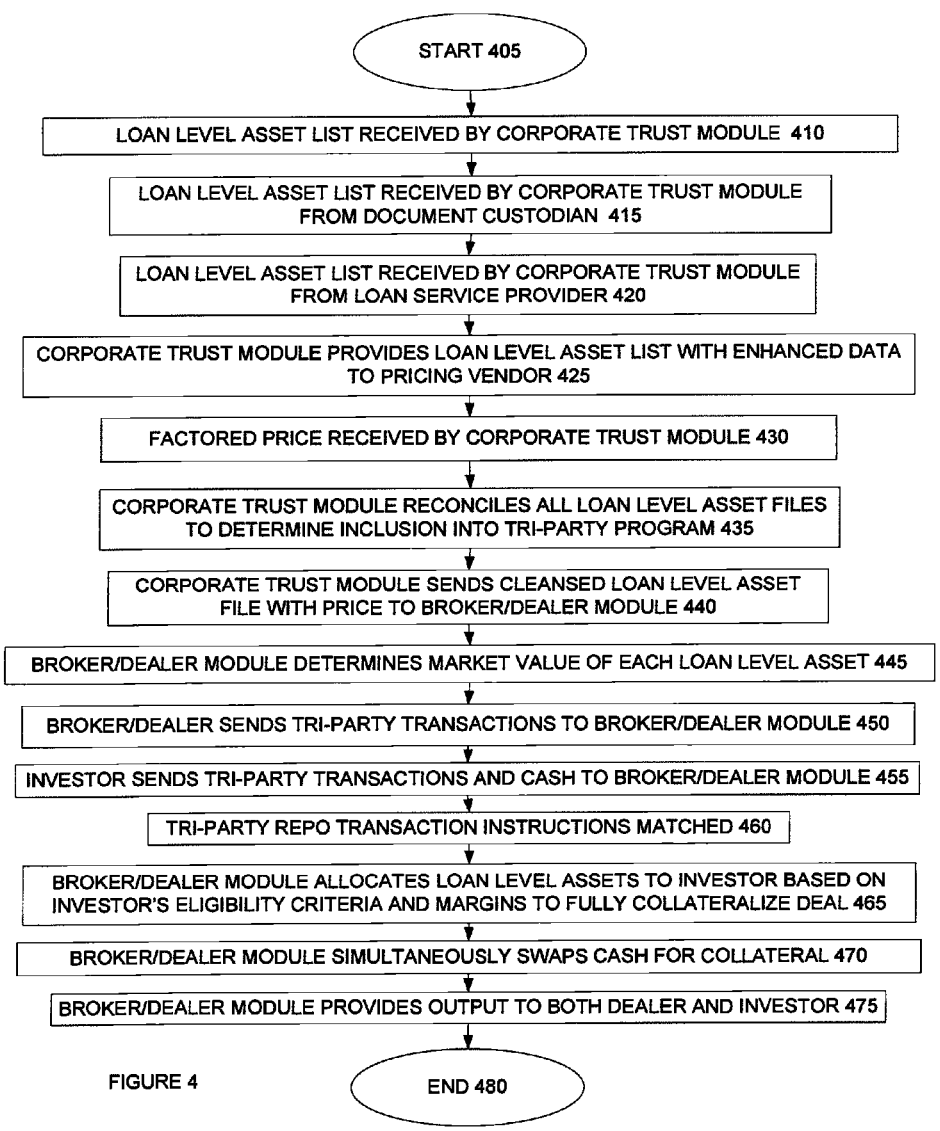
FIG. 4 provides a tri-party repo transaction processing flow provided in accordance with at least one embodiment of the invention.

As illustrated in FIG. 4, operations performed in connection with the invention may begin at 405 and control proceeds to 410 at which a loan level asset list is received by the corporate trust module from a broker/dealer. Control then proceeds to 415, at which the document custodian provides its version of the loan level asset list to the corporate trust module and control proceeds to 420. At 420, the loan service provider also provides its version of the loan level asset list to the corporate trust module. Subsequently, at 425, the corporate trust module generates and provides its version of the loan level asset list with enhanced data to the pricing vendor. Control then proceeds to 430, at which the pricing vendor provides the factored price back to the corporate trust module. At 435, the corporate trust module reconciles all loan level asset files to confirm which loan assets are eligible to be included in the transaction.

Control then proceeds to 440, at which the corporate trust module sends a cleansed loan level asset file with the price to the broker/dealer module. Subsequently, at 445, the broker/dealer module determines the market value of each loan level asset. Control then proceeds to 450, at which the broker/dealer sends tri-party transactions to the broker dealer module. At 455, the investor sends tri-party transactions and cash to the broker/dealer module. Subsequently at 460, an account administrator (or an automated or semi-automated account administration program or system) or the counterparties themselves directly match the tri-party repo transaction instructions. Control then proceeds to 465, at which the broker/dealer module allocates loan level assets to the investor(s)

based on the investor's eligibility criteria and margins to fully collateralize the deal. Control then proceeds to 470, at which the broker/dealer module simultaneously swaps cash for collateral. Subsequently at 475, the broker/dealer module provides output to both the broker/dealer/seller and the investor/buyer. Subsequently, control proceeds to 480, at which the processing operations end for a particular whole loan.

Optionally, if an independent third party pricing vendor is not used, the operation performed to determine a factored price may be performed by components of the tri-party repo processing system, e.g., the corporate trust module.

As an optional additional operation, the whole loan may be posed as a security on the whole loan tri-party repo processing system or some other associated system operated by the whole loan tri-party repo service provider by using the loan number as the CUSIP.

In accordance with at least one embodiment of the invention, the tri-party repo service provider may be configured to provide document custodian services to a dealer and receive files from loan service providers. In accordance with at least that embodiment, the tri-party repo service provider may also utilize independent pricing provided by a third party. Up to date balances at the loan level may be sent periodically, e.g., daily to the tri-party repo service providers system for processing tri-party repos. In accordance with at least that embodiment, a lien on assets may be more easily perfected because all assets are held by the tri-party service provider. Moreover, handling of physical trust receipts and assignment letters may become obsolete.

In accordance with at least that embodiment of the invention, liens on assets are perfected via a sub custodian agreement with the document custodians, electronic files of assets from third parties and a hard copy master trust receipt.

In accordance with each of the embodiments, as a result of the improved validation of data underlying the whole loan, tri-party repo transaction process, broker/dealers are better able to fund their whole loans via the tri-party process.

In accordance with at least one embodiment of the invention, various pieces of data, e.g., data elements, may be acquired, maintained and/or determined for each loan including performing, conforming, whether the loan is residential or commercial, the loan interest rate type and rate, the underlying property type, property state, amortization term, whether the loan is subprime, a loan identifier, outstanding principal balance, loan product, initial interest rate, loan to value, combined LTV (including all liens), an indication of whether a residential loan is a primary/secondary residence or investment property, an indication of the purpose of the loan proceeds (e.g., construction, purchase, re-finance, etc.), a number of dwelling units in the structure, the cost basis of the loan to the secondary marketing unit, the assigned internal value to the mortgage servicing right associated with the loan, the lenders internal estimation of market value (inclusive of MSR value), location, closing date, date the next scheduled payment is due, number of months required to amortize loan, description of the ARM index used to drive the loan interest rate, margin added to or subtracted from the index to derive the rate, the maximum amount the rate can increase on the first adjustable period, the maximum amount the rate can increase on any reset date after the first period, the maximum over the start rate that the rate can increase over the life of the ARM, the number of months to the first reset date, the number of months between resets after the first adjustment, the total amount of monthly debt payments required by the borrower (divided by monthly income), the FICO score assigned to the loan, etc.

Data elements may also include whether the loan payment will include escrow funds for payments, specification of whether a loan has an IO component, specification of when the loan converts to a P/I loan, whether the loan is eligible for delivery to FNMA or FHLMC, the identity of the loan owner, specification of the trust receipt that loan is a part of, the original principal on the loan, the paydown factor, the current rate, the identity of the document custodian, the loan servicer, whether the loan is held at the trust receipt or loan level, the price specified by an independent third party vendor, the price specified by the Dealer (if any), etc. These data elements may be used to filter allocations on the tri-party repo service provider's tri-part repo processing system.

Although not described in detail herein, those skilled in the art will appreciate that the embodiments of the present invention can be implemented using well-known computer, database, communications and programming technology. Also, those skilled in the art will further appreciate that the embodiments described herein are not limited to any specific software package, operating system, communications network, protocol or computer hardware.

The foregoing disclosure of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

The foregoing disclosure of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Furthermore, it should be understood that, in certain circumstances, one business entity may perform a number of different functions; as a result, operations performed by designated entities, explained above and in relation to the figures, may be performed by different parties than those specified. Moreover, one party may perform more than one function, e.g., the party providing the collateral management system may also serve as document custodian.

What is claimed is:

1. A system for providing collateral management service for whole loan tri-party repo transactions, the system comprising:
   at least one database maintained by a custodian that is not a party or counterparty to the whole loan tri-party repo transactions, said at least one database being configured to store characteristics of a whole loan that is the subject of a whole loan tri-party repo transaction;

at least one processor configured to perform operations to receive, analyze and determine data indicating characteristics of the whole loan that is the subject of a whole loan tri-party repo transaction, said at least one processor being configured to create and maintain, in the at least one database, an escrow account associated with the whole loan, wherein at least a portion of the data received indicating the characteristics of the whole loan is provided by one or more parties that is not a party to the whole loan tri-party repo transaction, wherein said at least a portion of the data provided by said one or more parties that is not a party to the whole loan tri-party repo transaction enables independent third party verification of loan balance and loan characteristics of the whole loan that is the subject of the whole loan tri-party repo transaction, wherein a valuation of the whole loan is determined by the at least one processor from price information provided by an independent third party pricing vendor, and wherein the custodian verifies to the party and counter-party that the whole loan that is the subject of the whole loan tri-party repo transaction is eligible to be included in the transaction.

2. The system of claim 1, wherein at least a portion of the data received indicating the characteristics of the whole loan is provided by a loan service provider.

3. The system of claim 2, further comprising one or more interfaces configured to receive data from the loan service provider.

4. The system of claim 1, wherein at least a portion of the data received indicating the characteristics of the whole loan is provided by a document custodian.

5. The system of claim 4, further comprising one or more interfaces configured to receive data from the document custodian.

6. The system of claim 1, further comprising one or more interfaces configured to receive data from the third party pricing vendor.

7. The system of claim 6, further comprising one or more interfaces configured to transmit data to the third party pricing vendor.

8. The system of claim 1, wherein the at least one processor is configured to determine the valuation of the whole loan asset based on a factored price for the whole loan stored as part of the data in the at least one database.

9. The system of claim 8, wherein the at least one processor is configured to determine the factored price based on data stored in the at least one database.

10. The system of claim 8, wherein the factored price is provided by the third party pricing vendor.

11. A computer-implemented method for providing collateral management service for whole loan tri-party repo transactions, the method comprising:

receiving, by a custodian, trade instructions from a broker/dealer/seller and an investor/buyer via a processor;

matching the instructions from the buyer/investor and instructions from the broker/dealer/seller using said processor;

receiving, in the processor, information representing a whole loan asset from the broker/dealer/seller and a loan amount from the investor/buyer;

providing, to the processor, data indicating characteristics of the whole loan that is the subject of the whole loan tri-party repo transaction from one or more third parties that is not a party to the whole loan tri-party repo transaction, wherein said data indicating characteristics of the whole loan provided by said one or more third parties that is not a party to the whole loan tri-party repo transaction enables independent third party verification of loan balance and loan characteristics of the whole loan that is the subject of the whole loan tri-party repo transaction, creating, via the processor, an escrow account associated with the whole loan; and storing the obtained data and received and matched instructions in at least one computer database operatively coupled to the processor, wherein at least said receiving trade instructions and said matching the instructions are carried out by the processor, and wherein said processor is configured to execute computer instructions embodied on a computer readable storage product and operatively loaded into said processor, wherein a valuation of the whole loan is determined by the processor from price information provided by a third party pricing vendor, and wherein the custodian verifies to the broker/dealer/seller and the investor/buyer that the whole loan is eligible to be included in the transaction.

12. The method of claim 11, wherein at least a portion of the data obtained indicating the characteristics of the whole loan is provided by a loan service provider.

13. The method of claim 12, wherein the data from the loan service provider is received via one or more computer interfaces.

14. The method of claim 11, wherein at least a portion of the data obtained indicating the characteristics of the whole loan is provided by a document custodian.

15. The method of claim 14, wherein the data from the document custodian is received via one or more computer interfaces.

16. The method of claim 11, further comprising determining, by the processor, a factored price based on the data indicating the characteristics of the whole loan stored in the at least one database.

17. The method of claim 16, further comprising using the processor to determine the valuation of the whole loan based on the factored price.

18. The method of claim 11, further comprising transmitting data indicating the characteristics of the whole loan to the third party pricing vendor.

19. The method of claim 18, further comprising receiving, in the processor, a factored price for the whole loan determined by the third party pricing vendor.

20. The method of claim 19, further comprising using the processor to determine the valuation of the whole loan based on the factored price.

21. The method of claim 11, further comprising receiving, in the processor, a factored price for the whole loan determined by the third party pricing vendor.

22. The method of claim 21, further comprising using the processor to determine the valuation of the whole loan based on the factored price.

* * * * *